US011179716B2

(12) United States Patent
Wilmer

(10) Patent No.: US 11,179,716 B2
(45) Date of Patent: Nov. 23, 2021

(54) METERING HEAD, METERING DEVICE COMPRISING A METERING HEAD, AND METHOD FOR METERING BY MEANS OF A METERING HEAD

(71) Applicant: Eppendorf AG, Hamburg (DE)

(72) Inventor: Jens Wilmer, Ahrensburg (DE)

(73) Assignee: Eppendorf AG, Hamburg (DE)

(*) Notice: Subject to any disclaimer, the term of this patent is extended or adjusted under 35 U.S.C. 154(b) by 359 days.

(21) Appl. No.: 16/309,037

(22) PCT Filed: May 24, 2017

(86) PCT No.: PCT/EP2017/062568
§ 371 (c)(1),
(2) Date: Dec. 11, 2018

(87) PCT Pub. No.: WO2018/001645
PCT Pub. Date: Jan. 4, 2018

(65) Prior Publication Data
US 2019/0314808 A1   Oct. 17, 2019

(30) Foreign Application Priority Data

Jun. 29, 2016 (DE) .................. 10 2016 111 912.1

(51) Int. Cl.
*B01L 3/02* (2006.01)
*G01N 35/10* (2006.01)

(52) U.S. Cl.
CPC .......... *B01L 3/0217* (2013.01); *B01L 3/0275* (2013.01); *G01N 35/1065* (2013.01); *G01N 2035/103* (2013.01)

(58) Field of Classification Search
None
See application file for complete search history.

(56) References Cited

U.S. PATENT DOCUMENTS 5,021,217 A * 6/1991 Oshikubo ............. B01L 3/0217
422/516
6,575,209 B2 * 6/2003 Gora ....................... B01L 9/543
141/130
(Continued)

FOREIGN PATENT DOCUMENTS

DE       19917375 C2    9/2001
DE       10022693 C1    10/2001
(Continued)

*Primary Examiner* — Matthew D Krcha
*Assistant Examiner* — Brittany I Fisher
(74) *Attorney, Agent, or Firm* — Edwin E. Voigt, II

(57) ABSTRACT

A metering head comprising:
  a carrier having parallel attachments,
  a stop plate having first holes through which the attachments extend, each attachment having:
  a tube with a projecting supporting protrusion,
  a sleeve with a tapering at the bottom end,
  an elastomer O-ring that encloses the tube, and
  the sleeves can be shifted between a release position and a clamping position; in the clamping position, the sleeves with the taperings are pressed into the O-rings and expand them,
  a first shifting apparatus shifting the sleeves between the release position and the clamping position,
  a second displacement apparatus shifting the stop plate between a stop position and an ejection position,
  wherein the second shifting apparatus has rocker arms pivotably mounted on the carrier, transmission shafts that are coupled to the sleeves, and ejection shafts which are securely connected to the stop plate.

18 Claims, 8 Drawing Sheets

(56) References Cited

U.S. PATENT DOCUMENTS

| | | | | |
|---|---|---|---|---|
| 6,589,483 B1* | 7/2003 | Maeda | ............... | B01L 3/0217 |
| | | | | 222/249 |
| 6,732,598 B2* | 5/2004 | Schoeppe | ............ | B01L 3/0279 |
| | | | | 73/864.14 |
| 7,897,111 B2 | 3/2011 | Naumann | | |
| 2002/0146353 A1* | 10/2002 | Bevirt | ................ | B01L 3/0227 |
| | | | | 422/501 |
| 2004/0231438 A1* | 11/2004 | Schwartz | ............ | B01L 3/0217 |
| | | | | 73/864.17 |
| 2007/0221684 A1* | 9/2007 | Steinbrenner | ......... | B67D 99/00 |
| | | | | 222/267 |
| 2008/0138249 A1* | 6/2008 | Itoh | ....................... | G01N 35/10 |
| | | | | 422/561 |
| 2009/0129985 A1* | 5/2009 | Ikushima | .......... | G01N 35/1074 |
| | | | | 422/400 |
| 2009/0274587 A1* | 11/2009 | Butz | .................... | B01L 3/0217 |
| | | | | 422/400 |
| 2012/0258026 A1* | 10/2012 | Naumann | ............. | G01N 35/04 |
| | | | | 422/521 |

FOREIGN PATENT DOCUMENTS

| | | | |
|---|---|---|---|
| DE | 102004003433 | B4 | 3/2006 |
| EP | 0737726 | B1 | 7/1999 |
| EP | 1407861 | B1 | 4/2008 |
| EP | 2735369 | A1 | 5/2014 |
| WO | 01/56695 | A1 | 8/2001 |
| WO | 2005/113149 | A1 | 12/2005 |
| WO | 2007/022667 | A1 | 3/2007 |

* cited by examiner

METERING HEAD, METERING DEVICE COMPRISING A METERING HEAD, AND METHOD FOR METERING BY MEANS OF A METERING HEAD

Cross-Reference to Related Applications

This application is a National Stage of PCT/EP2017/062568 filed on May 24, 2017, the contents of which is hereby incorporated by reference.

BACKGROUND OF THE INVENTION

The invention relates to a metering head for simultaneously picking up a plurality of pipette tips, a metering device comprising a metering head for simultaneously picking up a plurality of pipette tips, and a method for metering liquids by means of a metering head for simultaneously picking up a plurality of pipette tips.

BRIEF SUMMARY OF THE INVENTION

Metering devices ("pipetting devices") with a metering head ("pipetting head") for simultaneously picking up a plurality of pipette tips are used in particular in medical, biological, biochemical and chemical laboratories for metering liquids.

Metering heads for simultaneously picking up a plurality of pipette tips have a plurality of adjacently arranged parallel attachments that are inserted in the mounting openings in the top end of the pipette tips. Liquid is drawn into the pipette tips and discharged therefrom through a tip opening at the bottom end of the pipette tips.

After use, the pipette tips can be detached from the attachments and exchanged for fresh pipette tips. In this way, contamination of the subsequent meterings can be avoided. Pipette tips consisting of plastic are economically available for single use.

When designed as an air cushion pipetting device, at least one displacement apparatus is integrated in the pipetting device and connected via connecting holes in the attachments to communicate with the pipette tips. By means of the displacement apparatus, an air cushion can be shifted by the displacement apparatus so that the liquid is sucked into, and ejected out of, the pipette tips. The displacement apparatuses are generally cylinders with pistons that are movable therein. However, displacement apparatuses are also known with a displacement chamber and at least one deformable wall, wherein a deformation of the wall causes the displacement of the air cushion.

In the embodiment as a direct displacement pipetting device, a small piston is arranged in the pipette tip that is coupled to a piston drive of the pipetting device when the pipette tip is mounted on the attachment.

The liquid is preferably drawn in a single step or in several small steps. The liquid is dispensed in a single step when pipetting, and discharged in several small steps when dispensing.

The metering devices can be designed as practical multichannel pipettes that are driven manually or by electric motor and are held in the hand of the user when metering.

In metering stations ("pipetting stations") or metering machines ("pipetting machines"), the metering head can be shifted on a robot arm or another transferring system to shift the metering head above a work surface. Metering stations or metering machines can pick up fresh pipette tips from a holder by the metering head, draw liquids from vessels and discharge them into vessels by the pipette tips, and discard used pipette tips into a waste container. Metering stations or metering machines can be a component of laboratory machines ("workstations") that can perform other procedures with liquids beyond metering liquids. This includes in particular mixing, controlling temperature and other physical procedures, chemical or biochemical conversion, and the analysis of specimens.

The attachments for holding pipette tips are frequently designed as a conical, cylindrical, or partially conical and partially cylindrical projection relative to a housing or another carrier of the metering device. The pipette tips can generally be clamped on to the attachments by a sealing seat at their top end adjacent to a mounting opening. For this, the attachments are pressed into the mounting openings of the pipette tips available in a holder so that the pipette tips expand somewhat and sit securely on the attachments under tension. The force to be applied for clamping increases with the number of pipette tips.

To detach the clamped-on pipette tips from the attachments, the pipetting devices have an ejection apparatus with a drive apparatus and an ejector. By actuating the drive apparatus, the ejector is shifted so that it detaches the pipette tips from the attachments. The drive apparatus is either driven manually or by an electric motor. The ejection force for detaching clamped-on pipette tips from the attachments increases with the number of pipette tips.

Strong force must be applied to clamp pipette tips onto 96 or 384 attachments and to eject the pipette tips from the attachments.

DE 10 2004 003 433 B4 describes a multichannel pipette in which the applied force for clamping the pipette tips onto the attachments and detaching the pipette tips from the attachments is reduced in that the attachments are spring-loaded and project in an axial direction beyond a stop formed by the ejector. If the clamping force exceeds a specific value when clamping on the pipette tips, the attachments yield until the pipette tips lie on the ejector. This limits the clamping force to a value at which the pipette tips are sealingly held on the attachments. The ejection force is also correspondingly limited.

EP 2 735 369 A1 describes a multichannel pipette where the ejection force is further reduced in that the ejector has a plurality of contact elements that sequentially contact the pipette tips in order press them off the attachments.

WO 01/56695 A1 describes a pipetting head with 96 channels, wherein the attachments have a greater conical angle at the bottom end than above in order to reduce the force for mounting pipette tips with a collar having a greater wall thickness at the top end and a lesser wall thickness below the collar. The pipetting head comprises a stop plate for ejecting the pipette tips from the attachments. The stop plate is stepped in order to sequentially press off the pipette tips from the attachments and reduce the ejection force. Posts with pretensioning apparatuses project from the stop plate. A piston plate that shifts the pistons in cylinders connected to the attachments contacts the pretensioning apparatuses in order to trigger the ejection of the pipette tips from the attachments by the stop plate. The design with pretensioning apparatuses to eject pipette tips is complex.

WO 2005/113149 A1 describes a device for drawing and dispensing liquids with a pipetting head that has 96 attachments for pipette tips. 96 piston/cylinder units are connected to the attachments and can be manually actuated by a drive mechanism. The pipetting head can be shifted along a vertical guide in order to pick up pipette tips from a pipette tip carrier and suck in and dispense liquid. The pipetting head can be pressed downward with greater force by means of a transmission lever in order to apply the necessary force for picking up 96 pipette tips. The attachments are guided through holes in a perforated plate that is vertically shiftable in order to scrape the pipette tips off the attachments.

DE 20 2008 013 533 U1 describes a pipetting device with a base plate and an elastic sealing plate that covers it laterally on the outside, wherein a plurality of pipetting channels arranged in a given pattern extend through this baseplate and the sealing plate. A magazine equipped with pipette tips in the same pattern that each have a collar lies in a magazine holder to directly connect the base plate in a force fit via the collars and the sealing plate. The magazine holder is formed by a magazine frame that can be raised and lowered by a drive motor via an eccentric gearing in order to bring the pipette tips into sealing contact with the sealing plate, or to detach them from the sealing plate.

Pipetting machines that receive the pipette tips in a magazine in a magazine holder and press them against a sealing plate are marketed by the company Apricot Designs, Inc, Covina, Calif., USA, under the product name of "i-Pipette" and "i-Pipette Pro".

The disadvantage is that these pipetting machines can only work with special pipette tips in a special magazine. It is furthermore disadvantageous that the magazine holder is filled manually.

EP 0 737 726 A2 describes a device for simultaneously picking up a plurality of pipette tips by means of parallel attachments in a straight row that each have an elastomer O-ring in an annular groove with an adjustable groove width. The extension of the O-rings in the peripheral direction can be changed by adjusting the groove widths in order to sealingly clamp tight the pipette tips on the attachments and detach the pipette tips from the attachments. In order to adjust the groove widths, the grooves are each bordered by a threaded sleeve that is screwed onto the attachment and can be turned on the attachment by means of a coupled drive mechanism. Each threaded sleeve is securely connected to a toothed wheel. The toothed wheels mesh with a single rack that is driven by a rotatable handgrip. In an alternative embodiment, each individual threaded sleeve is individually driven by an electric motor, and the electric motors are connected to a common power supply for synchronous operation. Below the attachments, there is a guide plate with a row of notches for aligning the pipette tips on the attachments when lowering the device. The drive for securely clamping the pipette tips to the attachments has a complicated design. The notches do not prevent the pipette tips from tilting on the attachments. Accordingly, the device is only suitable for simultaneously picking up a small number of pipette tips that are not arranged too close to one another. The exemplary embodiment has four attachments for simultaneously picking up four pipette tips.

DE 199 17 375 C2 describes a pipetting unit with a pipette tip and an attachment that has a pipette tube with a coupling sleeve at the bottom end, an O-ring that is shoved onto the pipette tube and consists of an elastically deformable material, and a sleeve shoved onto the pipette tube. The sleeve serves to axially compress the O-ring so that it is deformed radially and engages sealingly in an annular groove in the inner perimeter of the pipette tip. The O-ring can be relieved to detach the pipette tip. To hold the pipette tip on the attachment in a predetermined position, the attachment and pipette tip have interacting axial positioning means. Since the O-ring engages in an annular groove in the pipette tip, the axial positioning means that adjoin each other are pretensioned. To eject of the pipette tip, a movable ejector is provided that is formed as the ejector tube surrounding the sleeve. The ejector is actuatable hydraulically or by an electric motor, or by means of a preloaded spring that is tensioned while mounting the pipette tip on the pipetting unit. The actuating means for securely clamping and detaching the pipette tip on the attachment are complex and have a large space requirement. Affixing the pipette tips in the specific coupling position can be easily prevented by production tolerances or imprecisely positioning the pipette tips on the attachment. The annular groove and the axial positioning means restrict the use of various pipette tips.

Against this backdrop, the object of the invention is to provide a metering head with a large number of attachments, in particular 96 or 384 attachments, for simultaneously picking up a large number of pipette tips that allows reliable automated picking up and detachment of variously designed pipette tips with reduced design complexity.

The metering head according to the invention for a metering device comprises:
- a carrier (2) on which a plurality of parallel attachments (42) for picking up pipette tips (43) are arranged adjacent to each other,
- a stop plate (75) that has a plurality of first holes (76) through which attachments (42) extend, wherein each attachment (42) has the following features:
- a tube (18) which has a supporting protrusion (30) at the bottom end that protrudes outward and extends peripherally at least partially,
- at least one sleeve (32, 38) with a peripheral tapering (33, 39) at the bottom end which surrounds the tube (18) and can be axially shifted on the tube (18),
- at least one elastomer O-ring (31, 37) which surrounds the tube (18) and is arranged adjacent to the tapering (33, 39), and the sleeves (32, 38) can be shifted between a release position at a first distance from the supporting projections (30) and a clamping position at a second distance from the supporting projections (30) that is smaller than the first distance; in the clamping position, the sleeves (38) with the taperings (39) are pressed into the adjacent O-rings (37), and the O-rings (31, 37) are expanded in order to securely clamp the pipette tips (43) shoved onto the attachments (42),
- a first shifting apparatus (74) that is coupled to the sleeves (32, 38) of all the attachments (42), and is designed to shift the sleeves (32, 38) between the release position and clamping position,
- a second shifting apparatus (77) that is connected to the stop plate (75) and is designed to shift the stop plate (75) between a stop position at a first distance from the supporting projections (30) and an ejection position at a second distance from the supporting projections (30) that is smaller than the first distance in order to shove pipette tips (43) on the attachments (42) in the stop position until contacting the stop plate (75), and to eject them from the attachments (42) by shifting the stop plate (75) from the stop position to the ejection position,
- wherein the second shifting apparatus comprises rocker arms (80) that are pivotably mounted on the carrier (2), transmission shafts (78) that are coupled to the sleeves (32, 38) and each contact one end of a rocker arm (80), and ejection shafts (81) which are securely connected to the stop plate (75) and each lie against another end of a rocker arm (80) so that when the sleeves (32, 38) are shifted into the release position, the transmission shafts (78) pivot the rocker arms (80), and they press the stop plate (75) via the ejection shafts (81) out of the stop position into the ejection position.

With the metering head according to the invention, all of the sleeves are shifted simultaneously by means of the first shifting apparatus. The shifting of the sleeves from the release position into the clamping position can accordingly expand all the O-rings and thereby secure on the attachments the pipette tips shoved onto the attachments. Conversely, by shifting the sleeves from the clamping position into the release position, all of the O-rings can be relaxed, and the clamping of the pipette tips can be detached thereby. Simultaneous clamping of a large number of pipette tips is enabled by simultaneously shifting all the sleeves into the clamping position and simultaneously detaching the pipette tips by shifting all of the sleeves into the release position. The invention is suitable in particular for metering heads with 96 or 384 attachments. The transmission of force from the first adjusting device to the sleeves promotes a comparatively simple, compact and light construction. Consequently, the design complexity of a metering device equipped with the metering head can also be reduced. Clamping securely by expanding the O-rings promotes the use of pipette tips with different shapes and dimensions. The invention comprises embodiments in which each attachment only has a single O-ring and only a single sleeve. Furthermore, the invention comprises embodiments in which each attachment has a plurality of a rings and a plurality of sleeves.

By means of the stop plate, all of the pipette tips are shoved simultaneously onto the attachments at a given position. To accomplish this, the metering head with the attachments can be inserted into a provided group of pipette tips until the stop plate sits on the top edge of the pipette tips.

The second shifting apparatus is connected to the stop plate and is designed to shift the stop plate between a stop position at a first distance from the supporting projections and an ejection position at a second distance from the supporting projections that is smaller than the first distance in order to shove pipette tips on the attachments in the stop position until contacting the stop plate, and to eject them from the attachments by shifting the stop plate from the stop position to the ejection position. This ensures the ejection of the pipette tips from the attachments even when the O-rings still lie against the insides of the pipette tips and securely hold them after being relieved by the sleeves. The stop plate is an ejection plate. In particular, the pipette tips can adhere to the rings after relieving the sleeves ("stick tight") so that they do not readily fall down.

The second shifting apparatus comprises rocker arms that are pivotably mounted on the carrier, transmission shafts that are coupled to the sleeves and each lie on one end of a rocker arm, and ejection shafts which are securely connected to the stop plate and each lie against another end of a rocker arm so that when the sleeves are shifted into the release position, the transmission shafts pivot the rocker arms, and they press the stop plate via the ejection shafts out of the stop position into the ejection position. In this embodiment, the movement of the sleeves is advantageously used to relieve the O-rings in order to shift the stop plate into the ejection position. This reduces the complexity of the second shifting apparatus. Moreover, the forces arising during the ejection of the pipette tips are captured by the metering head.

According to a preferred embodiment, attachments within the meaning of the invention are designed as a conical, cylindrical, or partially conical and partially cylindrical projection relative to the housing or another carrier. Preferably, the attachments are securely connected to the carrier of the metering head.

The O-rings have a circular shape in a longitudinal section according to a preferred embodiment so that they have the overall geometric shape of a torus. However, the invention also comprises embodiments in which the longitudinal section of the O-rings has a polygonal, elliptical, or other shape.

According to a preferred embodiment, the elastomer O-rings consist of rubber, silicone or thermoplastic elastomer.

Sleeves within the meaning of the invention can both be long, hollow-cylindrical bodies, wherein the length exceeds the inner diameter, as well as short hollow cylindrical bodies, wherein the length is less than the inner diameter. In particular, ring-shaped bodies are sleeves. The ring-shaped bodies can have different cross-sectional shapes. In particular, the ring-shaped bodies can have a polygonal, elliptical or circular shape in a longitudinal section.

When the ring-shaped bodies have a circular shape in a longitudinal section, they have the overall geometrical shape of a torus.

Taperings within the meaning of the invention are generally the surfaces of revolution that taper toward the bottom end of the sleeve. According to preferred embodiments, the taperings preferably have at least one of the following geometries: Frusticonical surface ("chamfer") or cone zone. Combinations of the aforementioned geometries are also taperings within the meaning of the invention.

The first shifting apparatus is designed such that it is able to shift the sleeves from the release position into the clamping position, and to shift the sleeves from the clamping position into the release position. With the metering head, when the sleeves are arranged in the release position, the pressure plate is also arranged in a release position, and when the sleeves are arranged in the clamping position, the pressure plate is also arranged in a clamping position.

The invention comprises embodiments in which the sleeves are shifted from the clamping position into the release position in that the first and displacement apparatus relieves the sleeves so that they are shifted out of the clamping position into the release position due to the resetting forces of the O-rings. In this case, the first shifting apparatus is for example formed by the pressure plate, and the third shifting apparatus. Furthermore, the invention comprises embodiments in which the first shifting apparatus actively shifts the sleeves out of the clamping position into the release position.

According to a preferred embodiment of the measuring head, each attachment has the following features:
A first sleeve with a peripheral first tapering at the bottom end which surrounds the tube and can be axially shifted on the tube, and
an elastomer first O-ring which surrounds the tube and is arranged adjacent to the first tapering;
A second sleeve with a peripheral second tapering at the bottom end which surrounds the tube above the first sleeve and can be axially shifted on the tube, and
an elastomer second O-ring which surrounds the tube, is arranged adjacent to the second tapering, and adjoins the first sleeve at the bottom,
wherein in the clamping position, the second sleeves with the second taperings are pressed into the adjacent second O-rings, and the first sleeves with the first taperings are pressed into the adjacent first O-rings, and the first and second O-rings are expanded in order to securely clamp the pipette tips shoved onto the attachments, and
a second shifting apparatus is coupled to the first and second sleeves of all the attachments, and is designed to shift the first and second sleeves between the release position and clamping position.

With the metering head, each attachment has a first O-ring and a second O-ring that can be expanded by pressing in a first sleeve and a second sleeve and can thereby be securely clamped in a pipette tip. Conversely, the clamping of the first O-ring and the second O-ring in the pipette tip can be detached. Since each pipette tip is securely clamped to an attachment by means of two rings, a precise alignment of a large number of pipette tips is enabled. This embodiment is suitable in particular for metering heads with 96 or 384 attachments, wherein the pipette tips must be aligned as parallel as possible so that they can be simultaneously introduced into a corresponding number of different seats. Moreover, the force required for securely clamping is reduced by using two O-rings. This promotes a comparatively simple, compact and light design. Consequently, the design complexity of a metering device equipped with the metering head can also be reduced. Furthermore, fixation by means of two O-rings promotes the use of pipette tips with different shapes and dimensions.

According to a preferred embodiment, the metering head comprises:

- a pressure plate (44) which is arranged above the sleeves (32, 38) and which has a plurality of second holes (45) through which the tubes (18) extend, wherein the pressure plate (44) can be shifted along the tubes (18) between a release position at a first distance from the supporting protrusions (30) in a clamping position into a second distance from the supporting protrusions (30) that is smaller than the first distance, the pressure plate (44) presses against the upper edge of the adjacent sleeves (38) of all attachments (42) in the clamping position in such a way that the sleeves (32, 38) are pressed into the adjacent O-rings (31, 37), and the O-rings (31, 37) are expanded in order to securely clamp pipette tips (43) shoved onto the attachments (42);
- a third shifting apparatus (51) which is connected to the pressure plate (44) and is designed to shift the pressure plate (44) between the release position and the clamping position.

In this embodiment, the pressure plate and the third displacement apparatus jointly form the first displacement apparatus. The pressure plate enables simultaneous shifting of the sleeves into the clamping position to securely clamp pipette tips, and simultaneously shifting of the sleeves into the release position to detach the pipette tips. This promotes a very simple, compact and light design. It can be used both with attachments that only have one sleeve as well as with attachments that have a plurality of sleeves. The stop plate is arranged below the pressure plate.

The invention comprises embodiments, wherein the sleeves are adjustable by means of other shifting apparatuses between the release position and the clamping position. In particular, the invention comprises embodiments in which each sleeve arranged above the attachment is screwed onto an adjustment thread of the attachment and can be rotated by means of a coupled gear mechanism, for example as described in EP 0 737 726 A2. Preferably, the displacement apparatus is designed such that the sleeves are each connected at the top to a toothed wheel so as to rotate conjointly, and a rack engages with the toothed wheels of a plurality of sleeves that are arranged in a row. The racks are in turn driven by a toothed wheel that can be securely arranged on the motor shaft of an electric motor. If the sleeves are arranged in several rows, the sleeves of each row can be driven by a rack and its own electric motor. Alternatively, a plurality of racks or a plurality of rows of sleeves are driven via a gear drive by a single electric motor. The transmission shafts can lie directly on the top edges of sleeves. It is also possible for the transmission shafts to each abut the top edges of a plurality of sleeves via a strip-shaped or plate-shaped transmission element with holes through which the attachments are guided.

According to another embodiment, a spring apparatus is between the stop plate as the carrier that shifts the stop plate back into the stop position when the sleeves are shifted from the release position into the clamping position. This is advantageous because the rocker arms are not swung back by the transmission shafts when the pressure plate is lowered. According to a preferred embodiment, the carrier has at least one stop apparatus against which the stop plate lies in stop position so that it cannot be further shifted toward the carrier. In a simple embodiment, the stop apparatus is formed by at least three stop elements that project downward from the bottom side of the carrier such that the top side of the stop plate comes into contact with the stop elements in the stop position.

The metering head is preferably designed so that the forces arising to expand the O-rings remain in the metering head and do not stress the metering device to be connected to the metering head. To accomplish this, the first shifting apparatus and/or the second shifting apparatus adjoins the carrier according to a preferred embodiment. To accomplish this, for example the first or second shifting apparatus is held or secured to the carrier. Since the first and/or second shifting apparatus adjoins the carrier, the reaction forces that act on the shifting apparatus are deflected when shifting the sleeves in the carrier. The reaction forces acting on the O-rings when pressing in the sleeves are deflected by the supporting projections, and the attachments are also deflected into the carrier. Consequently, the forces arising during the expansion of the O-rings remain within the metering head.

According to a preferred embodiment, the inner diameter of the first O-ring is less than the inner diameter of the second O-ring, and the outer diameter of the first O-ring is less than the outer diameter of the second O-ring. The statements refer to the undeformed state of the first O-ring and the second O-ring. This embodiment enhances a secure clamping of the pipette tips with an expansion at the top end on the attachments. The expansion facilitates the introduction of the attachments into the pipette tips.

According to another embodiment, the first O-ring is guided on the inner perimeter on the tube, and the second O-ring is guided on the inner perimeter on an end of the second sleeve engaging therein. This advantageously centers the first O-ring and the second O-ring on the attachment.

According to a preferred embodiment, the supporting projection is a support ring surrounding the bottom end of the tube. The support ring can advantageously be combined with the tube during production. According to another embodiment, the support ring tapers towards its bottom end. This facilitates the introduction of the attachment into the mounting opening of a pipette tip.

According to a preferred embodiment, the pressure plate is arranged below the carrier. The pressure plate can then lie directly on the peripheral top edges of the sleeve. The pressure plate can, however, also be arranged above the carrier and lie on the extensions of the sleeves that penetrate the passages in the carrier.

According to a preferred embodiment, the third shifting apparatus has at least one guide shaft that is connected at the bottom to the pressure plate and is coupled at the top by an eccentric gearing to an electric motor. This makes possible a structurally very simple and precise third shifting apparatus.

According to another embodiment, four guide shafts are securely connected at the bottom end to the pressure plate, and are coupled at the top end by at least one eccentric gearing to at least one electric motor. This yields precise parallel guidance of the pressure plate with minimal design complexity.

According to another embodiment, each guide shaft is mounted in a recirculating ball bearing that is held in the carrier. This yields a particularly low-friction and precise first shifting apparatus.

According to another embodiment, each guide shaft has a gate that extends at the top end perpendicular to the guide shaft, an eccentric that is on a first shaft oriented perpendicular to the guide shaft and the gate and engages in the gate, and the first shaft is coupled to an electric motor. This converts the rotational movement of an electric motor into the axial movement of at least one guide shaft in a particularly simple and low-friction manner.

According to a preferred embodiment, each eccentric there is a ball bearing that is guided in a gate. This yields a particularly low friction transmission of force from the eccentric to the guide shafts.

According to a preferred embodiment, a single electric motor is coupled by a gearing to all the first shafts. This yields a particularly simple, space-saving and weight-saving design. Synchronization of a plurality of electric motors so that the guide shafts run parallel is unnecessary. According to one preferred embodiment, the gearing is a worm gear.

According to one preferred embodiment, a plurality of first shafts are arranged parallel to each other and are connected to a first worm wheel so as to rotate conjointly, the first worm wheels are flush with each other, a second shaft is arranged in the same plane as the first worm wheels, the second shaft is connected to the first screw so as to rotate conjointly, wherein the first screw meshes with a first worm wheel, and a second shaft is coupled to the electric motor. This enables a space-saving and weight saving construction. According to another embodiment, the second shaft is connected to a second worm wheel so as to rotate conjointly, and the motor shaft of the electric motor is connected to a second screw so as to rotate conjointly and meshes with the second worm wheel. This promotes a space-saving and weight saving construction.

According to another embodiment, the at least one electric motor is coupled to an electric control apparatus that controls the electric motor such that the pressure plate can be shifted between the release position and the clamping position.

According to another embodiment, the at least one electric motor is coupled to a rotary encoder that is connected to the electric control apparatus which is designed to determine the position of the pressure plate depending on the rotational position of the motor shaft of the electric motor detected by means of the rotary encoder. This embodiment guarantees particularly precise shifting of the pressure plate between the release position and the clamping position.

According to another embodiment, a spacing ring is seated on each tube next to the pressure plate and presses the pressure plate via the spacing ring against the top end of the adjacent sleeve. This promotes a compact design since the pressure plate can be shifted close to the stoplight.

According to another embodiment, the sleeves have a flat face at the top against which the pressure plate, or the second O-ring, or the spacing ring lies. This yields an advantageous transmission of force between the sleeves and the O-rings.

According to another embodiment, pipette tips are arranged on the attachments of the metering head and are securely clamped by the expansion of the O-rings. The pipette tips are each tubes with a tip opening at the bottom end and a mounting opening at the upper end. The inner diameter and the outer diameter of the pipette tips generally expand from the tip opening to the mounting opening. According to a preferred embodiment, the top edges of the pipette tips lie against the bottom side of the stop plate.

According to a preferred embodiment, the metering head comprises at least one displacement apparatus that is communicatingly connected to the connecting holes of the attachments. For this, channels extend from a cylinder or another displacement chamber of the displacement apparatus through the attachments up to the connecting holes in the attachments. According to a preferred embodiment, the metering head comprises a plurality of displacement apparatuses, wherein the displacement chamber of each displacement apparatus is communicatingly connected to the connecting hole of a single attachment. According to a preferred embodiment, each displacement apparatus is a cylinder with a piston which can move therein. Alternatively, each displacement apparatus is a displacement chamber of at least one deformable wall.

Furthermore, the object of the invention is to provide a metering device with a large number of attachments, in particular 96 or 384 attachments, for simultaneously picking up a large number of pipette tips that allows reliable automated picking up and detachment of variously designed pipette tips with reduced design complexity.

Given the comparatively small size, the low weight of the metering head according to the invention and the reduced applied force for securely clamping pipette tips and detaching pipette tips from the metering head, the design complexity can be reduced for the metering device. The metering device can be designed for very small loads if the metering head is designed such that the forces that arise remain in the metering head upon expanding the O-rings.

According to a preferred embodiment, the metering device is a metering station, a metering machine or laboratory machine. According to a preferred embodiment, the metering station, the metering machine or laboratory machine is equipped with a metering head with 96 attachments for 96 pipette tips, or with a metering head with 384 attachments for 384 pipette tips.

According to another embodiment, the metering device is a manageable multichannel pipette that is driven manually or by an electric motor and can be held manually by the user when metering. The multichannel pipette preferably has eight attachments for eight pipette tips, or an integer multiple of eight attachments for a corresponding number of pipette tips.

According to a preferred embodiment, the metering station, the metering machine or the laboratory machine comprises at least one of the following apparatuses:
- at least one holder with a plurality of pipette tips held therein,
- at least one specimen vessel for providing liquid specimens,
- at least one reagent vessel for providing reagents,
- at least one waste container for picking up used pipette tips.

According to a preferred embodiment of the metering station, the metering machine or the laboratory machine, the metering head is held on a three-axis transfer unit that is designed to shift the metering head along three axes in space.

Furthermore, the object of the invention is to create a method for metering liquids with a metering head, in which a large number of pipette tips, in particular 96 or 384 pipette tips, in particular differently designed pipette tips, can be simultaneously, reliably and automatically picked up and detached with reduced design complexity.

In the method according to the invention for metering liquids, the liquids are metered by means of a metering head of the above-described type. It exploits the advantages ascribed to the metering head according to the above explanations.

According to a preferred embodiment of the method:
a group of pipette tips are provided in a holder for pipette tips,
the sleeves are shifted into the release position,
the metering head with the attachments is introduced into the mounting openings of the provided pipette tips so that the O-rings dip into the provided pipette tips,
the sleeves are brought into the clamping position, and the pipette tips are thereby clamped securely on the attachments,
the metering head is lifted, and the pipette tips securely clamped thereto are removed from the holder,
meterings are carried out with the pipette tips clamped securely to the attachments of the metering head,
the pipette tips are released from the attachments by shifting the sleeves from the clamping position into the release position.

According to a preferred embodiment, a metering station, a metering machine or a laboratory machine is equipped with the metering head, and the shifts of the metering head are carried out by a three-axis transfer unit of the metering machine or laboratory machine.

According to another embodiment, the metering head is coupled to an electrical control apparatus of the metering machine or laboratory machine, and the shifts of the first or second shifting apparatus of the metering head is controlled by the electronic control apparatus.

According to another embodiment, the stop plate is brought into the stop position before dipping the attachments into the pipette tips, and the attachments are dipped into the pipette tips until the top ends of the pipette tips lie against the stop plate, then the pipette tips are securely clamped to the attachments by shifting the sleeves from the release position into the clamping position, and after the meterings are carried out, the pipette tips are detached from the attachments by shifting the sleeves from the clamping position into the release position, and by shifting the stop plate from the stop position into the ejection position.

According to another embodiment, liquid is drawn from vessels and dispensed into vessels using the pipette tips on the metering head.

According to another embodiment, the metering head is shifted to be above a waste container before ejecting the pipette tips from the attachments, and the pipette tips are ejected into the waste container.

BRIEF DESCRIPTION OF THE SEVERAL VIEWS OF THE DRAWINGS

The invention is explained below based on the accompanying drawings of an exemplary embodiment. In the drawings.

DETAILED DESCRIPTION OF THE INVENTION

In this application, the terms "top" and "bottom" refer to an orientation of the metering head with the attachments in a vertical direction, wherein the attachments are arranged at the bottom and the other parts of the metering head are arranged above.

Figure 1:
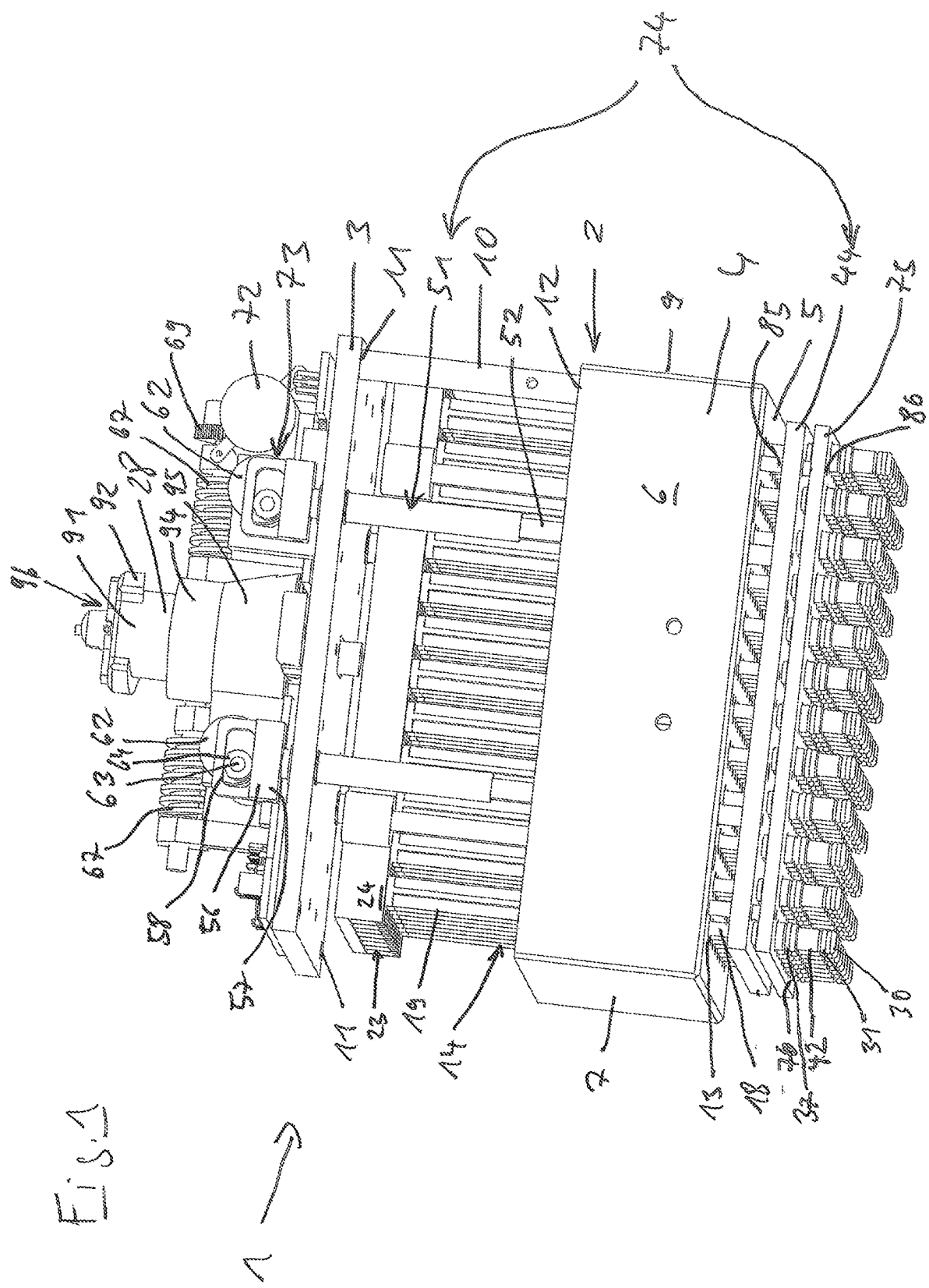
FIG. 1 shows a metering head in a perspective view diagonally from the front and from the side.
Figure 2:
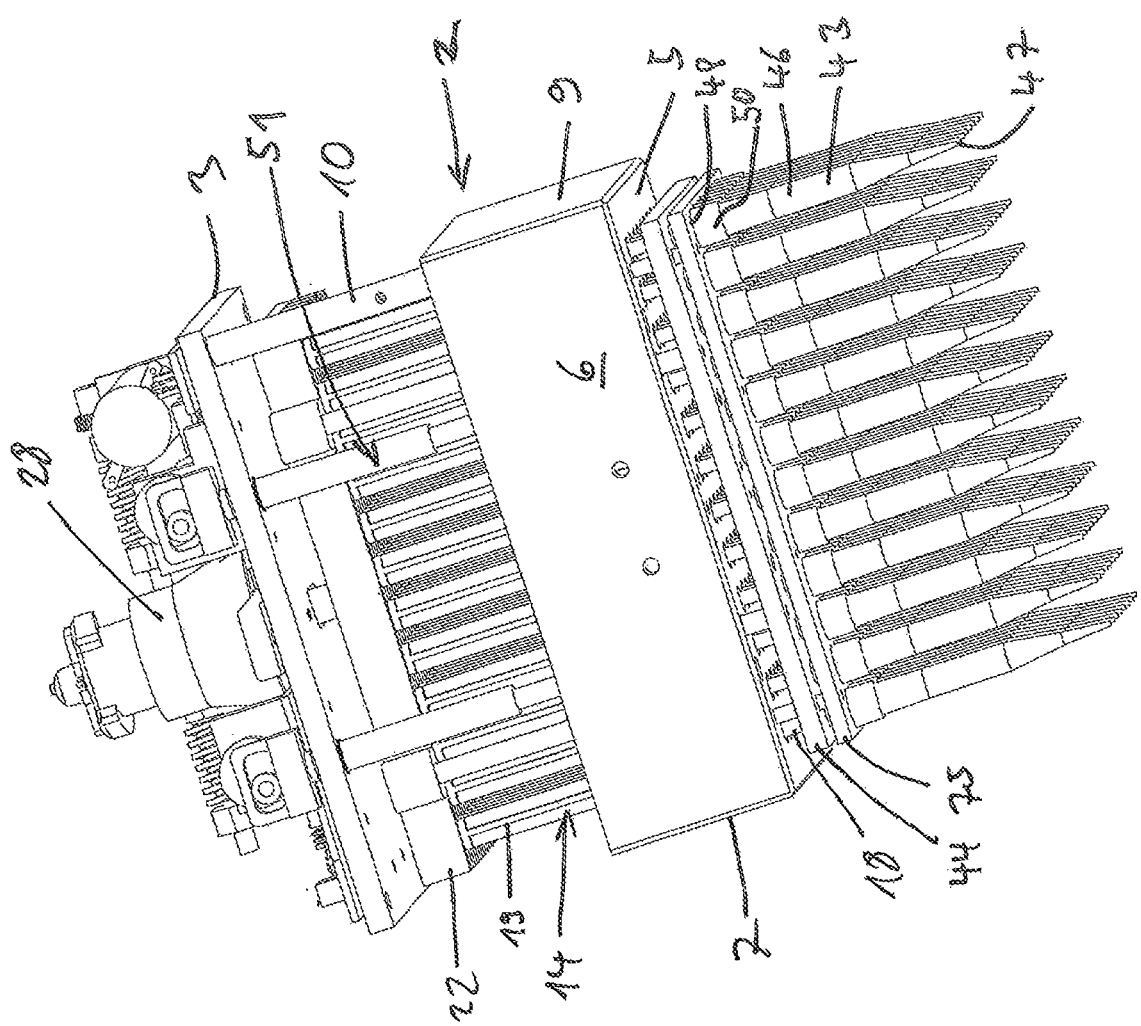
FIG. 2 shows the metering head with pipette tips in a perspective view diagonally from the front and from the other side.
Figure 3:
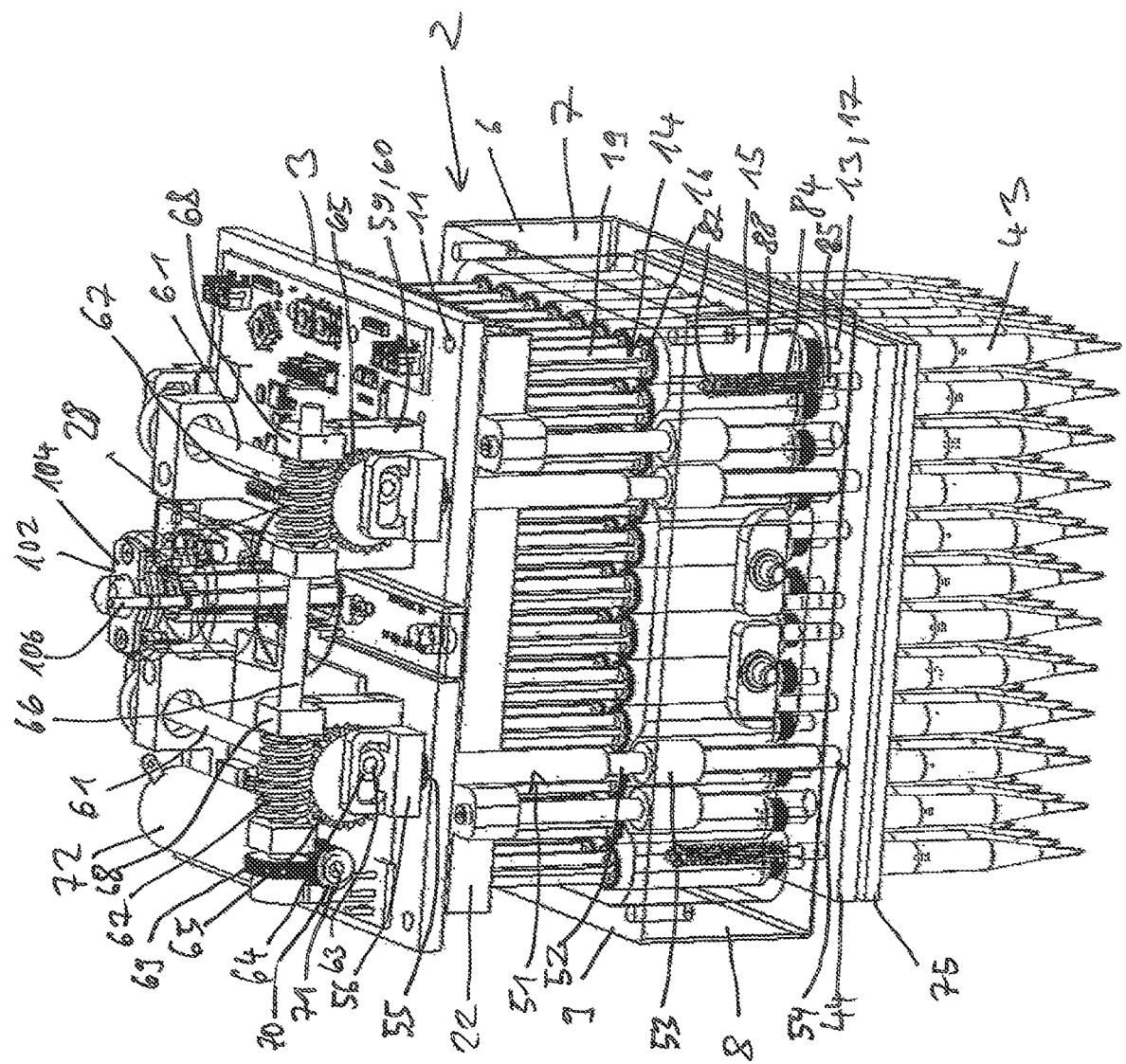
FIG. 3 shows the metering head with pipette tips in a perspective view diagonally from the rear and from the side.

According to FIGS. 1 to 3, a metering head 1 comprises a multipart carrier 2 that has a rectangular carrier plate 3, and underneath a box-shaped carrier housing 4 that is open at the top. The carrier housing 4 has a bottom wall 5 and side walls 6, 7, 8, 9 that project upward from the edges of the bottom wall 5. The carrier plate 3 is oriented parallel relative to the bottom wall 5. The carrier plate 3 is secured by studs 10 at a distance from the top edge of the carrier housing 4. The ends of the studs 10 are screwed into first and second threaded holes 11, 12 at the four corners of the carrier plate 3 and the top edge of the carrier housing 4. For reasons of simplification, only one stud 10 is shown.

A total of 96 third threaded holes 13 are formed in the bottom wall 5 in a pattern arrangement with eight rows and twelve columns. The metering head comprises 96 parallel piston/cylinder units 14. The pattern corresponds to the pattern of recesses of a microtiter plate according to the SBS (Society for Biomolecular Screening) specification. Each piston/cylinder unit 14 has one cylinder 15 and one piston 16. Each cylinder 15 has an outer thread 17 that is screwed into one of the third threaded holes 13. At the bottom, each cylinder 15 has a tube 18 that projects downward from the bottom wall 5.

A piston 16 that seals the perimeter and is axially movable is inserted into each cylinder 15. Each piston 16 is connected to a piston rod 19 that projects out of the cylinder 15 at the top. Each piston rod 19 has a piston head 20 at the top end and a peripheral annular groove 21 underneath.

A rectangular piston plate 22 parallel to the carrier plate 3 is arranged below the carrier plate 3. At the bottom side, the piston plate 22 has eight channels 23 that are open at the bottom and run parallel to the rows consisting of third threaded holes 13 in the bottom wall 5.

Each channel 23 is bordered by two strip-shaped channel walls 24, and by two channel shoulders 25 that project to the inside from the bottom ends of the channel walls 24. The channel walls 24 on the two longitudinal edges of the piston plate 22 each border the adjacent channel 23 only on one side. The other channel walls 24 each border two adjacent channels 22 on one side. Between the channel shoulders 25, each channel has one slotted opening 26.

On the short edges of the piston plate 22, the channels 23 have front openings 27. The piston heads 20 of the piston rods 19 are inserted into the channels 23 through the face openings 27 so that the channel shoulders 25 engage the annular grooves 21 in a form fit. Consequently, the pistons 16 can be shifted by vertically shifting the piston plate 22 in the cylinders 15.

From the top side of the carrier plate 3, a fastening pin 28 of a bayonet lock projects upward. In the center of the fastening pin 28, an axially shiftable threaded nut 29 is arranged, the bottom end of which is securely connected to the piston plate 22 in order to shift the piston plate 22 in the axial direction of the cylinders 15. Details of the fastening pin 28 will be addressed below.

At the bottom end, each tube 18 has a radially projecting peripheral supporting projection 30. This is designed as a support ring fixed on the tube.

Figure 4:
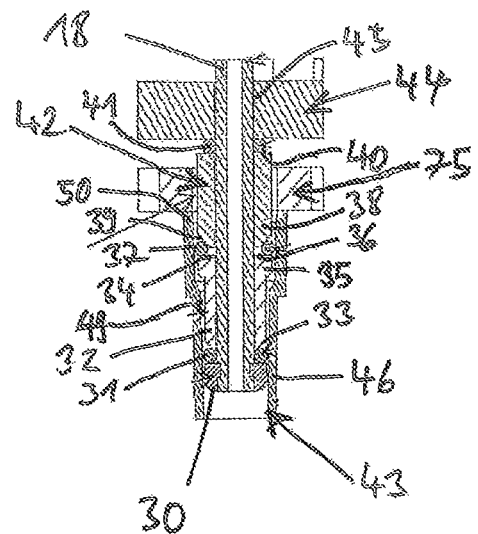
FIG. 4 shows a vertical section of an attachment of the metering head introduced into a pipette tip before securely clamping the pipette tip.

According to FIG. 4, a first O-ring 31 consisting of an elastomer material is guided on the tube 18 next to the supporting projection 30. A first sleeve 32 with a first tapering 33 at the bottom end in the form of a peripheral chamfer is guided above the first O-ring 31 on the tube 18. The first sleeve 32 can be inserted by the first tapering 33 deeper into the first O-ring 31. At the top first end 34, the first sleeve 32 has a peripheral collar 35 that in turn has a flat first face 36 at the top side. A second O-ring 37 that consists of elastomer material and is guided on the tube 18 adjoins the top side of the first sleeve.

Above this, a second sleeve 38 is guided on the tube 18. The second sleeve 38 has a second tapering 39 in the form of a chamfer at the bottom. The second sleeve 38 can be inserted with the second tapering 39 deeper into the second O-ring 37.

The second sleeve 38 has a flat, second face 40 at the top. A spacing ring 41 that is guided on the tube 18 adjoins the second face 40.

The first and the second sleeve 32, 38 consist of a rigid material, such as a metal or a plastic. The first and second O-rings 31, 37 consist of an elastomer material such as rubber, silicone or thermoplastic elastomer. The spacing ring 41 consists of an elastomer or substantially rigid material.

The tubes 18 together with the supporting projection 30, the first and second O-rings 31, 37 and the first and second sleeves 32, 38 form an attachment 42 for securely clamping pipette tips 43.

A pressure plate 44 is arranged below the bottom wall 5 and above the second sleeve 38. This has second holes 45 through which the tubes 18 of the attachments 42 are guided. The second holes 45 are dimensioned such that the pressure plate 44 lies with the edge of the second holes 45 on the top side of the spacing rings 41.

According to FIGS. 3 and 4, a pipette tip 43 is a tube 46 with a tip opening 47 at the bottom end and a mounting opening 48 at the top end. The pipette tip 43 has a sealing seat 49 on the inside adjacent to the mounting opening 48. The inner diameter and the outer diameter of a pipette tip 43 generally expand from the tip opening 47 to the mounting opening 48. In the example, the pipette tip 43 has a plurality of conical and cylindrical regions, as well as a cylindrical expansion 50 in the proximity of the top end.

Figure 5:
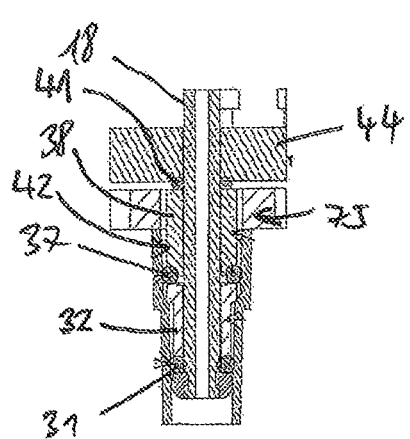
FIG. 5 shows a vertical section of the attachment securely clamped in the pipette tips.

According to FIG. 4, an attachment 42 of the metering head 1 is introduced through the mounting opening 48 into the pipette tip 43. The O-rings 31, 37 are arranged at the height of the sealing seat 49. According to FIG. 5, the first and second sleeves 32, 38 are shoved downward by shifting the pressure plate 44 downward so that the first and second O-rings 31, 37 are pressed together axially and expanded in the peripheral direction. This sealingly clamps the mounted pipette tip 43 securely to the attachment. By lifting the pressure plate 44, the clamping of the pipette tip 43 to the attachment 42 can be released.

According to FIGS. 1 to 3, there is a third shifting apparatus 51 to shift the pressure plate 44 in a vertical direction. This has four guide shafts 52 that are securely connected to the pressure plate 44. Each guide shaft 52 is screwed in at the bottom to the pressure plate 44. Each guide shaft 52 is guided with low friction in a recirculating ball gear 53 which is held in the carrier housing 4.

The four guide shafts 52 are guided through first through-holes 54 in the bottom wall 5 and second through-holes 55 in the carrier plate 3 and project upward above the carrier plate 3. There, each guide shaft 52 is connected to a gate element 56 that has a gate base 57 at the bottom into which the guide shaft 52 is screwed. On the top side of the gate base 57, each gate element 56 has a gate 58 in the form of a slot.

Four gates 58 are arranged symmetrically relative to the fastening pin 28 on the longitudinal edges of the carrier plate 3.

On the top side of the carrier plate 3, first shafts 61 are mounted in two first bearing blocks 59 in each case with first ball bearings 60 held therein. The first shafts 61 each bear at their ends an eccentric disk 62 with an eccentric 63 arranged thereon. A second ball bearing 64 is mounted on each eccentric 63 and engages in a gate 58.

Each eccentric disk 62 has a first worm wheel 65 on the perimeter. The two first worm wheels 65 are arranged in a plane.

Within this plane above the two worm wheels 65 is a second shaft 66 on which two first screws 67 are formed that mesh with the worm wheels 65. The second shaft 66 is mounted in the second bearing blocks 68 that are fixed to the top edge of the first bearing blocks 59 which bear the first shafts 61 in addition to the worm wheels 65.

A second worm wheel 69 sits on the end of the second shaft 66. The second worm wheel 69 meshes with a second screw 70 which is fixed to the motor shaft 71 of an electric motor 72 which is aligned parallel to the first shaft 61.

The rotational movement of the motor shaft 71 of the electric motor 72 is transmitted by the second shaft 66 to the first shafts 61. These shift the pressure plate 44 via the eccentric gearing 73 with eccentrics 63 and gates 58 and the guide shafts 52. By driving the electric motor 72 in different directions, the pressure plate 44 can accordingly be lifted or lowered. This can fix or release the pipette tips 43 on the attachments 42.

The third shifting apparatus 51 accordingly comprises all the components from the guide shafts 52 to the electric motor 72 that cause the shifting of the pressure plate 44. The third shifting apparatus 51 and the pressure plate 44 together form a first shifting apparatus 74 for shifting the sleeves 32, 38.

A rectangular stop plate 75 is arranged below the pressure plate 44. The stop plate 75 has first holes 76 in which the attachments 42 engage. The first holes 76 are dimensioned such that the attachments 42 including the supporting projections 30, the first and second O-rings 31, 37 and the first and second sleeves 32, 38 can be inserted through the first holes 76.

The stop plate 75 can be shifted in a vertical direction. In a stop position that is located further upward, the stop plate 75 serves as a stop for mounting pipette tips 43. In an ejection position that is located further below, the stop plate 75 presses all the pipette tips 43 off the attachments 42.

Figure 6:
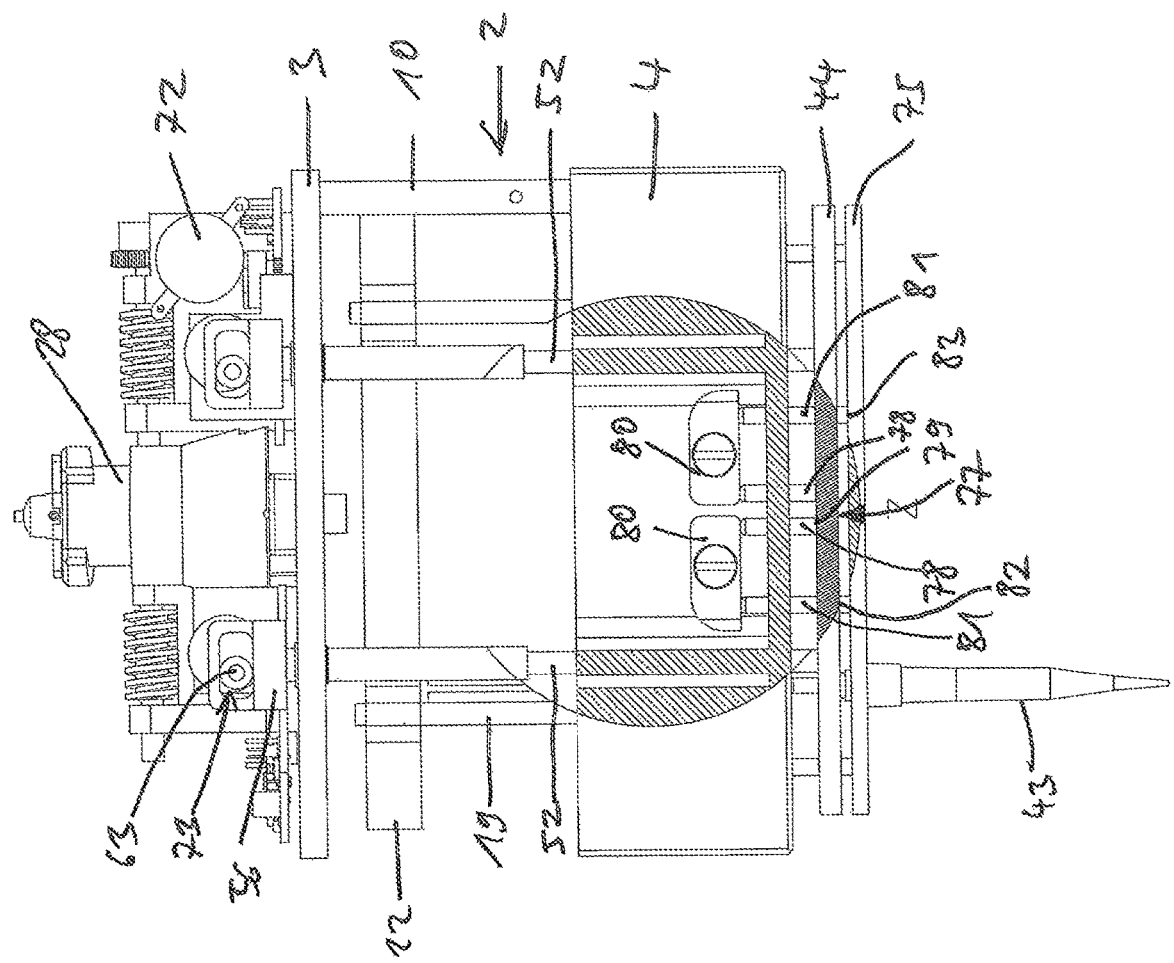
FIG. 6 shows the metering head with a pipette tip securely attached in a partially cutaway front view.
Figure 7:
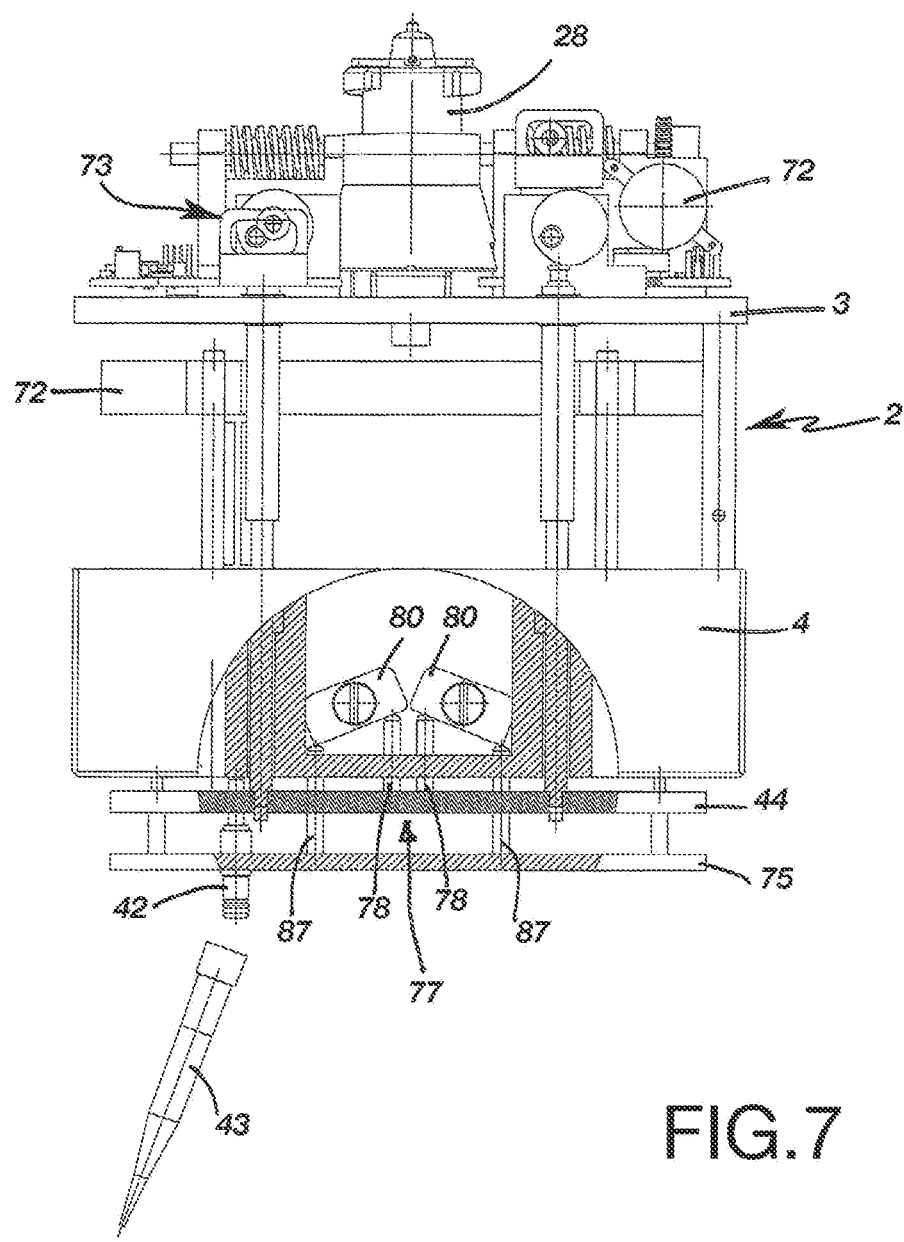
FIG. 7 shows the metering head during the ejection of the pipette tip in a partially cutaway front view.
Figure 8:
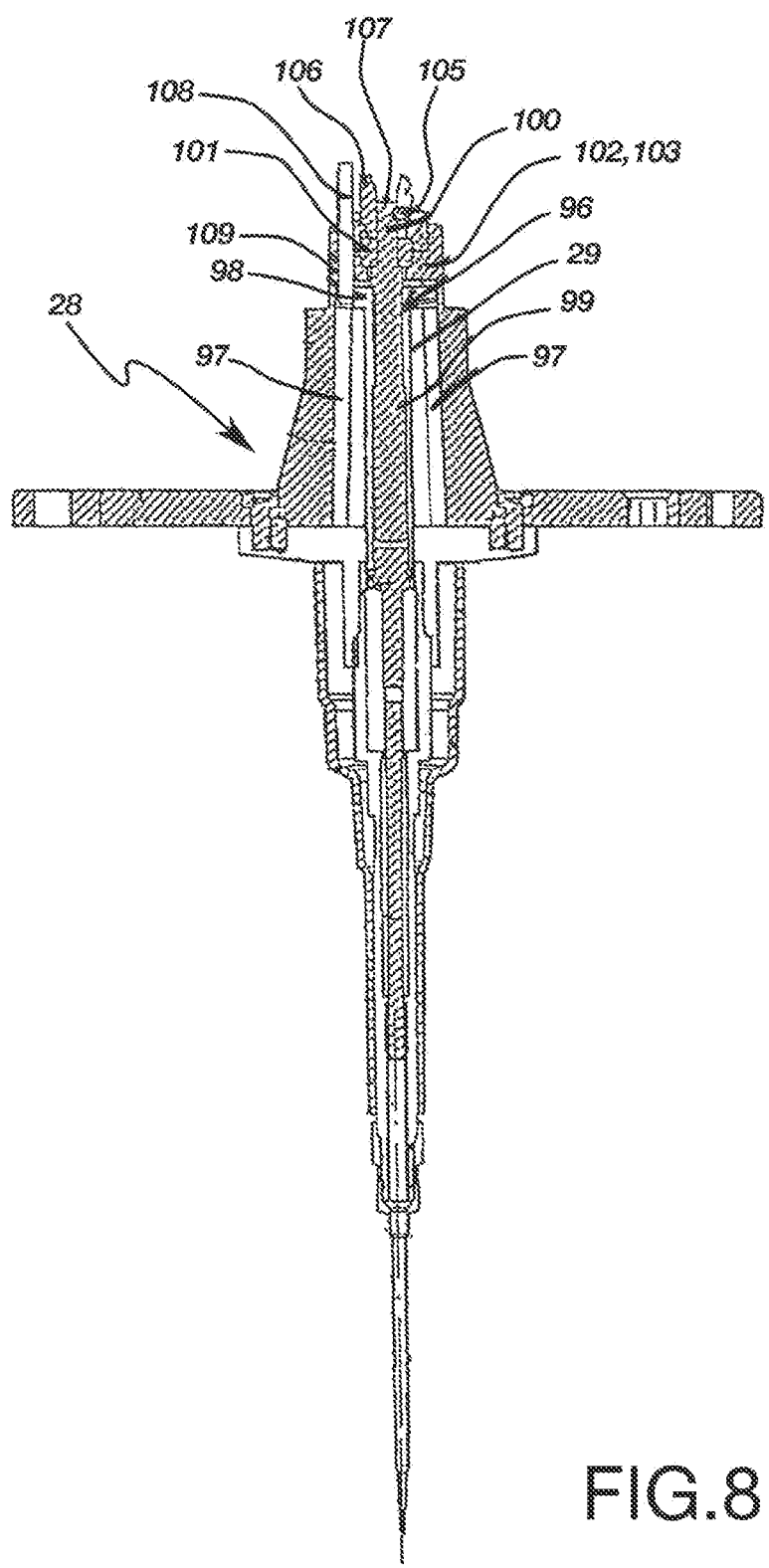
FIG. 8 shows a vertical section of a top part of the metering tool comprising a fastening pin and a piston plate.

According to FIGS. 6 and 7, there is a second shifting apparatus 77 to shift the stop plate 75 in a vertical direction. This comprises transmission shafts 78, wherein two transmission shafts 78 project upward from each longitudinal side of the pressure plate 44. The transmission shafts 78 are screwed in by their bottom ends into threaded holes 79 of the pressure plate 44.

The top ends of the transmission shafts 78 lie loosely against the ends of rocker arms 80 that are pivotably mounted on the insides of the bearing housing 4. The other ends of the rocker arms 80 lie loosely against the top ends of ejection shafts 81 that are guided through third through-holes 82 in the pressure plate 44, and the bottom ends of which are screwed into fourth threaded holes 83 in the stop plate 75.

According to FIG. 3, the stop plate 75 adjoins the bottom wall 5 of the carrier housing 4 via four spring elements 84. The spring elements 84 each have a guide rod 85 that is screwed at its bottom end into a fifth threaded hole 86 in the stop plate 75. A plate 87 is fixed to the top end of the guide rod 85. A pretensioned helical spring 88 that presses the stop plate 75 upward is guided on the guide rod 85 between the plate 87 and the top side of the bottom wall 5. The shifting of the stop plate 75 upward is limited by the stop plate 75 adjoining the pressure plate 44 by means of the ejection shafts 81 guided through the through-holes 82 in the pressure plate 44, the rocker arm 80 and the transmission shafts 78 projecting upward from the pressure plate 44.

When the pipette tips 43 are being mounted, the pressure plate 44 is in the release position, and the stop plate 75 is in the stop position according to FIGS. 4 and 6. The pipette tips 43 can be shoved onto the attachments 42 until lying against the stop plate 75.

By means of the eccentric gearing 73 and the guide shafts 52, the pressure plate 44 is shifted downward to the clamping position and thereby securely clamps the pipette tips 43 to the attachments 42. In so doing, the stop plate 75 is preferably prevented from escaping upward out of the stop position by a stop apparatus with stop elements that project downward from the bottom wall 5. This situation is shown in FIGS. 2, 3, 5 and 6.

To eject the pipette tips, the pressure plate 44 is shifted upward to the release position. In so doing, the clamping of the pipette tips 43 on the attachments 42 is released. At the same time, the transmission shafts 78 tip the rocker arms 80, and the latter shifted the ejection shafts 81 and hence the stop plate 75 downward into the ejection position. This scrapes the pipette tips 43 off of the attachments 42. This situation is shown in FIG. 7.

To again pick up pipette tips 43, the guide shafts 52 are lifted until the pressure plate 44 reaches the release position, and the stop plate 75 reaches the stop position in FIG. 1.

According to FIGS. 1 to 3 and 8, the fastening pin 28 has a cylindrical top pin section 91 at the top. On the outer perimeter, the top pin section 91 bears two partially peripheral connecting elements 92 that are offset to each other by 180° and project radially to the outside in order to form a bayonet connection 93. The connecting elements 92 have a slight thread pitch at the bottom side to be tightened with a fitting connecting element in a pin holder of a bayonet connection.

Adjacent to the top pin section 91, the fastening pin 28 has a cylindrical, middle pin section 94 with a larger outer diameter than the top pin section 91.

Underneath, the fastening pin 28 has a bottom pin section 95 that expands conically downward. The bottom pin section 95 is fixed at its base to the top side of the carrier plate 3.

A central hole 96 extends in the longitudinal direction of the fastening pin 28. This has two diametrically opposed longitudinal grooves 97.

The sleeve-like threaded nut 29 is inserted in the central hole 96 and is guided by two radially projecting wings 98 at its top end in the longitudinal grooves 97.

Furthermore, a spindle 99 is screwed into the threaded nut 29. Above its thread, this has a projecting bearing pin 100 by which it is mounted in a third ball bearing 101. The third ball bearing 101 is held in a bearing bushing 102 of a bearing carrier 103 that has two tabs 104 that project diametrically from the sides and lie on the top edge of the top pin section 91 and are fixed thereto by means of screws.

On a part of the bearing pin 100 that projects beyond the third ball bearing 101, a driver 106 is fixed non-rotatably by means of a radial threaded pin 105 and has a slot 107 extending radially and axially in its top face for introducing a pawl-like drive unit.

The spindle 99 adjoins the face of the third ball bearing 101. The driver 106 adjoins the top side of the bearing carrier 103. The spindle 99 is held hereby in the fastening pin 28 so as to not be axially shiftable.

In one wing of the threaded nut 29, a cylinder pin 108 is fixed that is guided by a groove 109 in the bearing carrier 103 oriented parallel to the middle axis of the threaded nut 29 and projects upward out of the fastening pin 28.

By rotating the driver 106, the spindle 99 that is axially fixed in the fastening pin 28 moves the threaded nut 29 that is non-rotatably guided in the fastening pin 28 in an axial direction. This shifts the piston plate 22 and the piston 16 in the cylinders 15. By rotating the driver 106 in different directions, the pistons 16 can be shifted in different directions in the cylinders 15. By scanning the position of the cylinder pin 108, it is possible to determine the respective position of the piston 16 in the cylinders 15.

The fastening pin 28 and the drive with the threaded nut 29 and spindle 99 integrated therein correspond to the exemplary embodiments in FIGS. 1 to 4 as well as 6 according to EP 1 407 861 B 1. The relevant description is included in the present application by means of reference.

A metering machine or laboratory machine is provided with a complementary pin holder of a bayonet lock that is connectable to the fastening pin. Preferably, the complementary connecting part corresponds to the tool holder according to FIGS. 7 to 10 of the aforementioned patent. The relevant description is included in the present application by means of reference.

Figure 9:
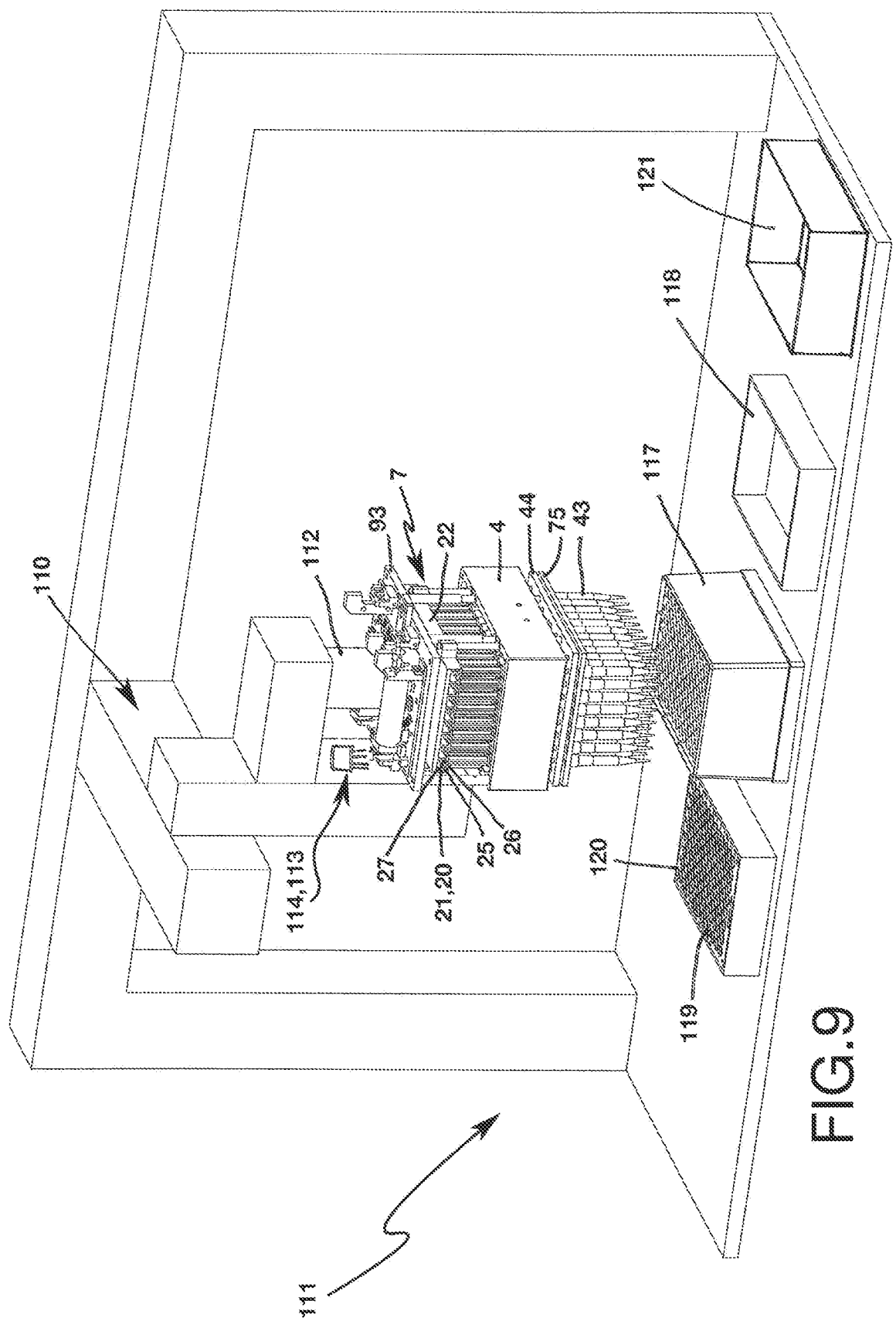
FIG. 9 shows the metering head in a metering machine in a perspective view diagonally from the top and from the side.

According to FIG. 9, the metering head 1 is coupled to a three-axis transfer unit 110 of a metering machine 111. For this, the fastening pin 28 is held in a corresponding pin holder 112 on the three-axis transfer unit 110. Additional apparatuses for coupling first plug-in connections 113 and second plug-in connections 114 of an electrical power supply 115 of the metering machine for the electric motor 72 and an electric control apparatus 116 of the metering machine 111 with the metering head 1 are also in the three-axis transfer unit 110. By means of the second plug-in connections 114, for example signals from a rotary encoder that detects the rotational position of the motor shaft 71 are transmitted to the control apparatus 110, and motor control signals are transmitted from the control apparatus 116 to a motor control on the metering head 1.

With the assistance of the metering machine 111, pipette tips 43 can be automatically picked up and ejected, and liquids can be metered. In FIG. 9, the metering head 1 is lifted out of a holder 117 with the clamped-on pipette tips 43 after picking up pipette tips 43. The metering head 1 can be moved to draw liquids from a reservoir 118 such that the tip openings dip in the storage container 118. After drawing liquid, the metering head 1 with the pipette tips 43 can be moved into the wells 119 of a microtiter plate 120 in order to dispense liquid into the wells. The liquid can be further processed in the microtiter plate 120, for example mixed with other liquids, or physically, chemically or biochemically treated or analyzed. Finally, the metering head 1 can be moved over a waste container 121, and the pipette tips 43 can be ejected into the waste container 121.

REFERENCE SIGN LIST

1 Metering head
2 Carrier
3 Carrier plate
4 Carrier housing
5 Floor wall
6 Side wall
7 Side wall
8 Side wall
9 Side wall
10 Studs
11 (First) threaded hole
12 (Second) threaded hole
13 (Third) threaded hole
14 piston/cylinder unit
15 Cylinder
16 piston
17 External thread
18 Pipe
19 piston rod
20 piston head
21 Annular groove
22 piston plate
23 Channel
24 Channel wall
25 Channel shoulder
26 Slotted opening
27 Face opening
28 Fastening pins
29 Threaded nut
30 Supporting projection
31 (First) O-ring
32 (First) sleeve
33 (First) tapering
34 (First) end
35 Collar
36 (First) face
37 (Second) O-ring
38 (Second) sleeve
39 (Second) tapering
40 (Second) face
41 Spacing ring
42 Attachment
43 Pipette tip
44 Pressure plate
45 (Second) holes
46 Tube
47 Syringe opening
48 Mounting opening
49 Sealing seat
50 Expansion
51 (Third) shifting apparatus
52 Guide shaft
53 Recirculating ball gear
54 (First) through-holes
55 (Second) through-holes
56 Gate element
57 Gate base
58 Gate
59 (First) bearing block
60 (First) ball bearing
61 (First) shaft
62 Eccentric disc
63 Eccentric
64 (Second ball bearing)
65 (First) worm wheel
66 (Second) shaft
67 (First) screw
68 (Second) bearing block
69 (Second) worm wheel
70 (Second) screw
71 Motor shaft
72 Electric motor
73 Eccentric gearing
74 (First) shifting apparatus
75 Stop plate
76 (First) holes
77 (Second) shifting apparatus
78 Transmission shaft
79 Threaded hole
80 Rocker arm
81 Ejection shaft
82 (Third) through-hole
83 (Fourth) threaded hole
84 Spring element
85 Guide rod
86 (Fifth) threaded hole
87 Plate
88 Helical spring
91 (Top) pin section
92 Connecting element
93 Bayonet connection
94 (Middle) pin section
95 (Bottom) pin section
96 (Central) hole
97 Longitudinal groove
98 Wing
99 Spindle
100 Bearing pin
101 (Third) ball bearing
102 Bearing bushing
103 Bearing carrier
104 Tab
105 Threaded pin
106 Driver
107 Slot
108 Cylindrical pin
109 Groove
110 Three-axis transfer unit
111 Metering machine
112 Pin holder
113 (First) plug-in connection
114 (Second) plug-in connection
115 Power supply
116 Control apparatus 117 Holder
118 Storage container
119 Wells
120 Microtiter plate
121 Waste container

The invention claimed is:

1. A metering head for a metering machine or another metering device, comprising:
a carrier on which a plurality of parallel attachments are arranged adjacent to each other, the plurality of parallel attachments being constructed and arranged to pick up pipette tips,
a stop plate having a plurality of first holes, each attachment of the plurality of parallel attachments extending through one of the plurality of first holes wherein each attachment of the plurality of parallel attachments has the following features:
a tube having a bottom end and a supporting protrusion that protrudes outward and extends peripherally at least partially from the bottom end,
at least one sleeve having a peripheral tapering at a sleeve bottom end, the at least one sleeve surrounding the tube, the at least one sleeve being axially shifted on the tube,
at least one elastomer O-ring surrounding the tube, the least one elastomer O-ring being arranged adjacent to the peripheral tapering, and
the at least one sleeve being shiftable between a release position at a first distance from the supporting protrusion and a clamping position at a second distance from the supporting protrusion, the second distance being smaller than the first distance in the clamping position, wherein the at least one sleeve having the peripheral tapering is pressed into the at least one elastomer O-ring, and the at least one elastomer O-ring is expanded in order to securely clamp one of the pipette tips shoved onto one of said plurality of parallel attachments;
a first shifter that is coupled to each of the at least one sleeve of each of the plurality of parallel attachments, the first shifter being constructed and arranged to shift each of the at least one sleeve of each of the plurality of parallel attachments between the release position and clamping position,
a second shifter that is connected to the stop plate the second shifter being constructed and arranged to shift the stop plate between a stop position at a first stop distance from the supporting protrusion and an ejection position at a second stop distance from the supporting protrusion, the second stop distance being smaller than the first stop distance, in order to shove one of the pipette tips on the plurality of parallel attachments in the stop position to contact the stop plate, and to eject the pipette tips from the plurality of parallel attachments by shifting the stop plate from the stop position to the ejection position,
wherein the second shifter comprises a plurality of rocker arms that are pivotably mounted on the carrier (2), a plurality of transmission shafts, each of the plurality of transmission shafts being coupled to each of the at least one sleeve of each of the plurality of parallel attachments, each of the plurality of transmission shafts contacting one end of each of the plurality of rocker arms, and a plurality of ejection shafts which are securely connected to the stop plate and each of the plurality of ejection shafts lie against another end of each of the plurality of rocker arms wherein shifting of the at least one sleeve into the release position, moves the plurality of transmission shafts to pivot the plurality of rocker arms, pressing the stop plate via the plurality of ejection shafts out of the stop position into the ejection position.

2. The metering head according to claim 1, wherein of the plurality of parallel attachments comprises:
a first sleeve having a peripheral first tapering proximate to a first sleeve bottom end, the first sleeve surrounding the tube the first sleeve being constructed and arranged to be axially shifted on the tube,
an elastomer first O-ring surrounding the tube, the elastomer first O-ring being adjacent to the peripheral first tapering,
a second sleeve having a peripheral second tapering proximate to a second sleeve bottom end, the second sleeve surrounding the tube above the first sleeve, the second sleeve being constructed and arranged to be axially shifted on the tube,
an elastomer second O-ring surrounding the tube, the elastomer second O-ring being adjacent to the peripheral second tapering adjoining the first sleeve (32) at the second sleeve bottom end,
wherein in the clamping position, the second sleeve having the peripheral second tapering is pressed into the second O ring, and the first sleeve having the peripheral first tapering is pressed into the first O ring , and the first O-ring and the second O ring are expanded securely clamping the pipette tips shoved onto the plurality of parallel attachments, and
wherein the first shifter is coupled to the first sleeve and the second sleeve of each of the plurality of parallel attachments the first shifter being constructed and arranged to shift the first sleeve and the second sleeve between the release position and clamping position.

3. The metering head according to claim 1, comprising:
a pressure plate which is arranged above the at least one sleeve, and which has a plurality of second holes the tube of each attachment of the plurality of parallel attachments extending through one of the plurality of second holes, wherein the pressure plate can be shifted along the tubes between the release position at the first distance from the supporting protrusion into the clamping position at the second distance from the supporting protrusion, the pressure plate presses against an upper edge of each of the at least one sleeve on each of the plurality of parallel attachments in the clamping position whereby each of the at least one sleeve is pressed into each of the at least one elastomer O-ring, and each of the at least one elastomer O-ring is expanded in order to securely clamp the pipette tips shoved onto each of said plurality of parallel attachments; and
a third shifter which is connected to the pressure plate, the third shifter being constructed and arranged to shift the pressure plate between the release position and the clamping position.

4. The metering head according to claim 3, wherein the plurality of transmission shafts are securely connected to the pressure plate and project upward therefrom.

5. The metering head according to claim 3, wherein the third shifter has at least one guide shaft that is connected at a guide shaft bottom to the pressure plate and is coupled at a guide shaft top by an eccentric gearing to an electric motor.

6. The metering head according to claim 5, wherein each of the at least one guide shaft is mounted in a recirculating ball bearing that is held in the carrier.

7. The metering head according to claim 3, wherein the stop plate is arranged below the pressure plate.

8. The metering head according to claim 1, wherein the first shifter and/or the second shifter adjoins the carrier.

9. The metering head according to claim 8, wherein each of the at least one guide shaft has a gate that extends at the guide shaft top perpendicular to the at least one guide shaft, an eccentric that is on a first shaft oriented perpendicular to the at least one guide shaft and the gate, and the first shaft engages in the gate, and the first shaft is coupled to an electric motor.

10. The metering head according to claim 9, wherein the eccentric bears a ball bearing that is guided in the gate.

11. The metering head according to claim 8, wherein the electric motor is coupled by a gearing to the first shaft.

12. A metering device comprising a metering head according to claim 1.

13. The metering device according to claim 12 wherein the metering device is a metering station, or a metering machine, or a laboratory machine, or a multichannel pipette.

14. The metering device according to claim 13, further comprising at least one of:
  at least one holder having a plurality of the pipette tips held therein,
  at least one specimen vessel containing liquid specimens,
  at least one reagent vessel containing reagents, and
  at least one waste container containing used pipette tips (43).

15. The metering device according to claim 13, wherein the metering head is held on a three-axis transfer unit, the three-axis transfer unit shifting the metering head along three axes.

16. A method for metering liquids, wherein the liquids are metered by the metering head according to claim 1, wherein the pipette tips are clamped on the plurality of parallel attachments of the metering head.

17. The method according to claim 16, wherein:
  a group of the pipette tips are provided in a holder,
  the at least one sleeve of each of the plurality of parallel attachments of the metering head are shifted into the release position,
  the metering head with the plurality of parallel attachments is introduced into top ends of the pipette tips until the at least one elastomer O-ring dips into the pipette tips,
  the at least one sleeve of each of the plurality of parallel attachments is brought into the clamping position, and the pipette tips are clamped securely on the plurality of parallel attachments,
  the metering head is lifted, and the pipette tips securely clamped thereto are removed from the holder,
  meterings are carried out with the pipette tips clamped securely to the plurality of parallel attachments of the metering head,
  the pipette tips are released from the plurality of parallel attachments by shifting the at least one sleeve of each of the plurality of parallel attachments from the clamping position into the release position.

18. The method according to claim 16, wherein the stop plate is brought into the stop position before dipping the plurality of parallel attachments into the pipette tips, and the plurality of parallel attachments are dipped into the pipette tips until the top ends of the pipette tips lie against the stop plate, then the pipette tips are securely clamped to the plurality of parallel attachments by shifting the at least one sleeve of each of the plurality of parallel attachments from the release position into the clamping position, and after the meterings are carried out, the pipette tips are detached from the plurality of parallel attachments by shifting the at least one sleeve of each of the plurality of parallel attachments from the clamping position into the release position, and by shifting the stop plate from the stop position into the ejection position.

* * * * *